Jan. 7, 1941.　　　　E. C. MAYNE　　　　2,227,944
ANTIGLARE SHIELD
Filed Feb. 8, 1938
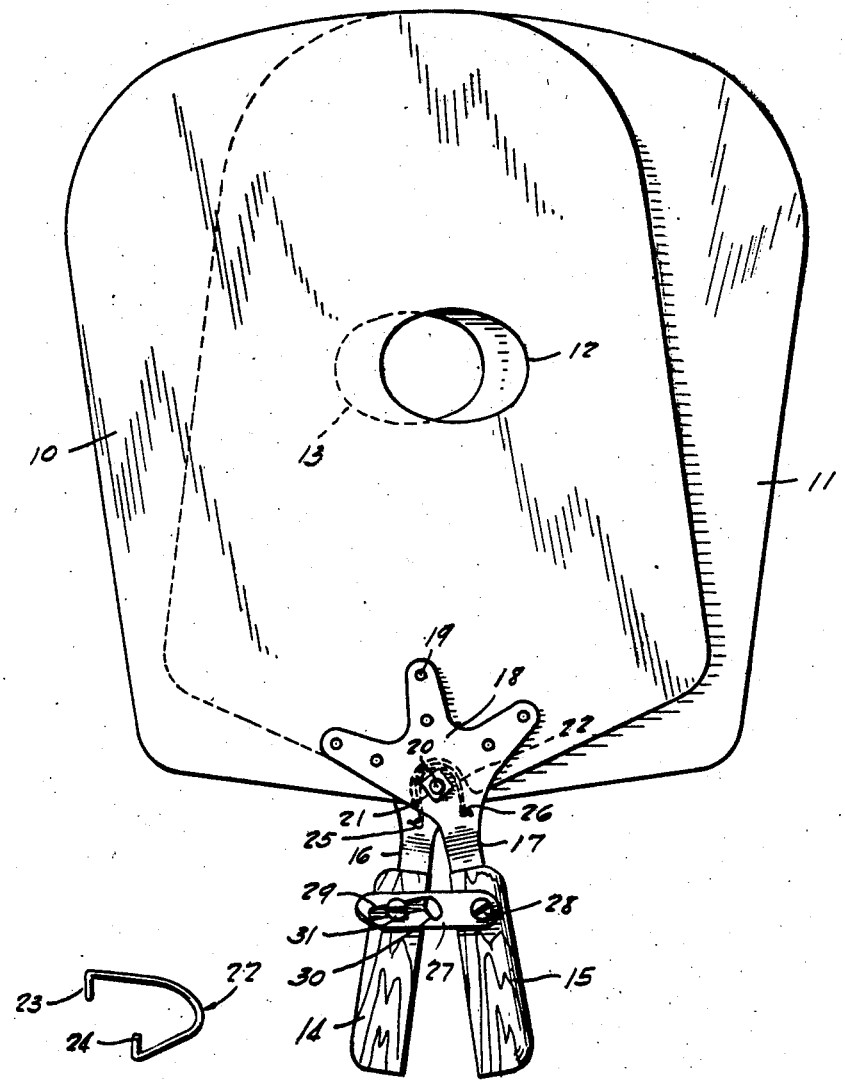
Fig. 3　　　Fig. 1.
Fig. 2
INVENTOR.
Edward Charles Mayne
BY 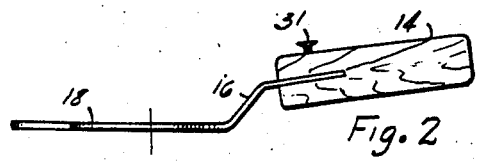
ATTORNEY.

Patented Jan. 7, 1941

2,227,944

UNITED STATES PATENT OFFICE 2,227,944

ANTIGLARE SHIELD

Edward Charles Mayne, Philadelphia, Pa.

Application February 8, 1938, Serial No. 189,360

6 Claims. (Cl. 2—11)

This invention relates to the art of shields designed for the purpose of reducing and eliminating glare, and is concerned primarily with a shield that is adapted for use in X-ray work.

At the present time the field of usefulness of X-ray work has been extended from the medical profession to the various industrial arts, and is particularly meeting with approval in the textile and metallurgical industries.

In examining X-ray photographs, ordinarily, there is some small part of the photograph which must receive the careful and concentrated attention of the examiner making the inspection, and as the photographs are usually placed against a background of strong light, the glare from the latter is highly annoying to the inspector, and is often quite harmful to the eyes.

With the foregoing conditions in mind, this invention has in view, as its foremost objective, the provision of an antiglare shield that is designed for X-ray and similar work involving backgrounds of strong light, and which shield is intended to restrict the field of vision, in accordance with the requirements of any particular inspection.

More in detail this invention has in view, as a further objective, the provision of an antiglare shield having a vision opening, the size of which opening may be restricted in accordance with the will of the operator of the shield.

In carrying this idea out in a practical embodiment, the invention contemplates the use of two complemental shield elements, each of which is formed with a vision opening. The openings in each shield element are of the same size and shape, and when in alignment, the maximum field of vision is provided. However, as the openings become out of alignment, the field of vision is narrowed and restricted.

Particular features and objects of the invention are associated with the provision of means for mounting the shield elements in such a manner as to provide for relative movement therebetween, and which movement is preferably carried out under a high degree of simplicity.

A further more detailed object of the invention is the provision of a pair of complemental shield elements of the character above-noted, which are pivotally mounted and provided with means for yieldably urging said openings in a position of alignment. The shield elements are provided with operating elements in the form of handles, and associated with the latter is a suitable fastening device for maintaining the shields in alignment with each other, but with the vision openings out of alignment.

Various other more detailed objects and advantages will in part become apparent and in part be hereinafter stated as the description of the invention proceeds.

The invention, therefore, comprises a pair of complemental shield elements each formed with a vision opening. These shield elements are pivotally assembled and each is provided with an operating member in the form of a handle. Spring means are provided for normally urging said shield elements into a position in which the vision openings are in alignment while the handles are provided with a fastening device for maintaining them in a closely assembled position in which the vision openings are out of alignment.

For a full and more complete understanding of the invention, reference may be had to the following description and accompanying drawing, wherein:

Figure 1 is a plan view of an antiglare shield made in accordance with the precepts of this invention, Figure 2 is a view in side elevation of one of the operating handles and structures for mounting the same on the shield elements, and Figure 3 is a detailed perspective showing of the spring element.

Referring now to the drawing, wherein like reference characters denote corresponding parts, an antiglare shield is shown in its entirety in Figure 1 as comprising complemental shield elements 10 and 11. These elements 10 and 11 are, preferably, made from a suitable opaque material, such as black fibre board. The shield elements 10 and 11 should be of a size and shape which renders them particularly adaptable to obscuring a background of strong light. Obviously, this size and shape may be varied as occasion demands, but the size and form illustrated in the drawing have been found suitable for certain kinds of work.

Each of the sheld elements 10 and 11 is formed with openings designated 12 and 13, respectively. The openings 12 and 13 are of identical size and shape, preferably taking the oval formation illustrated. When these openings are in alignment, the maximum field of vision is provided. As the shield elements 10 and 11 are moved relatively to one another, the openings 12 and 13 come out of alignment, thus restricting the field of vision.

The shield element 11 is shown as provided with an operating member in the form of a handle 14, while the shield element 10 carries a complemental handle 15. These handles 14 and 15 may be mounted on the shield elements 10 and 11, in any preferred manner, and in the illustrated form of the invention, metallic members 16 and 17 are shown as employed for that purpose. Each of these members 16 and 17 terminates in a spider-like construction 18, the legs of which are secured to the material of the shield elements 10 and 11 by appropriate fastening elements, such as the rivets designated 19.

Extending through aligned openings in the shield elements 10 and 11 and the spiders 18, is a pivot pin 20 which may be headed on one side (not shown), and provided with a nut 21 on the other side. This pin 20 constitutes the pivotal mounting for the shield elements 10 and 11.

A spring 22 is shown in Figure 3 as being of a horseshoe formation and formed with anchoring ends 23 and 24. The end 23 is received in an opening 25 in the connecting member 16, while the end 24 is received in the opening 26 in the member 17. As illustrated in Figure 1, this horseshoe formation of the spring 22 extends about the pivot pin 20 and the spring 22 normally exerts a tension, tending to spread the handles 14 and 15 and the shield elements 10 and 11. When the shield elements 10 and 11 are in alignment with each other (the handles 14 and 15 being in engagement), the openings 12 and 13 are out of alignment. However, when they are spread apart under the influence of the spring 22, the openings 12 and 13 gradually come into alignment, thus increasing the field of vision until the maximum is reached. Figure 1 develops an intermediate position in which the spring 22 is not fully expanded, thus bringing the openings 12 and 13 only into partial alignment.

A fastening device for maintaining the handles 14 and 15 in their most closely assembled relationship is shown as comprising an arm 27 that is pivotally mounted at 28 on the handle 15. This arm 27 is formed with an inclined slot 29 which terminates in an enlarged notch 30. A headed pin 31 is secured to the handle 14 and moves in the slot 29. When the pin 31 is received in the notch 30, the handles are in their most closely assembled relationship and are maintained in that position by the engagement of the pin 31 with the walls of the notch 30.

However, upon proper manipulation by the operator, the pin 31 may be released from the notch 30, whereupon it will move in the slot 29 because of the influence of the spring 22. When the pin 31 reaches the end of the slot 29, the openings 12 and 13 will be in alignment.

In using the above-described antiglare shield, the photograph which is to be inspected is first placed against the background of strong light. The shield is then interposed between the eyes of the operator and the background. The size of the field of vision, as defined by the openings 12 and 13, may be varied so that only that particular portion of the photograph which is to be inspected will be against the background. Thus, the glare on the eyes of the operator is reduced to a minimum and he is enabled to concentrate his attention on the particular part of the photograph in the manner desired.

While a preferred specific embodiment of the invention is hereinbefore set forth, it is to be clearly understood that I am not to be limited to the exact constructions illustrated and described, because various modifications of these details may be provided in putting the invention into practice, within the purview of the appended claims.

I claim:

1. An antiglare shield of the character described, comprising a pair of complemental shield elements each formed from opaque material and having a vision opening, a pivot pin for assembling said shield elements in pivotal relationship, an operating member for each of said shield elements, spring means normally urging said shield elements into a position in which said vision openings are in alignment, and a fastening device for maintaining said operating members closely assembled in a position in which the vision openings are out of alignment.

2. An antiglare shield of the character described, comprising a pair of complemental shield elements each formed with a vision opening, said shield elements being pivotally assembled, spring means for causing relative pivotal movement of said shield elements, and a fastening device for maintaining said shield elements immovable against the influence of said spring means, said fastening device constituting a means for limiting pivotal movement of said shield elements.

3. An antiglare shield of the character described, comprising a pair of complemental shield elements formed from opaque material, each of said shield elements being formed with a vision opening, a handle member for each of said shield elements, said handle members being connected to the shield elements by metallic connecting structures which are anchored to the shield elements, a pivot pin extending through aligned openings in said metallic structures and shield elements, spring means associated with said metallic structures for causing pivotal movement of the shield elements, an arm pivotally mounted on one of said handle members and formed with a slot, and a pin on the other of said handle members extending through and movable in said slot.

4. An antiglare shield of the character described comprising a pair of complemental shield elements each formed with a vision opening, said shield elements being pivotally assembled, spring means for varying the relative positions of said vision openings, and operating members for moving said shield elements in opposition to said spring means.

5. An antiglare shield of the character described comprising a pair of complemental shield elements each formed with a vision opening, said shield elements being pivotally assembled, spring means for varying the relative positions of said vision openings, and an operating member carried by each of said shield elements on the side opposite said pivotal mounting, said operating members being movable towards each other in opposition to said spring means.

6. An antiglare shield of the character described comprising a pair of complemental shield elements, each formed with a vision opening, said shield elements being pivotally assembled, a fastening device for maintaining said shield elements in position with said vision openings out of alignment, and spring means for urging said shield elements into position in which said vision openings are in alignment.

EDWARD CHARLES MAYNE.